United States Patent Office 3,119,841
Patented Jan. 28, 1964

3,119,841
13β-n-PROPYL-GONANES, INTERMEDIATES
AND PROCESS
Gérard Nominé, Noisy-le-Sec, Robert Bucourt, Clichy-sous-Bois, and André Pierdet, Noisy-le-Sec, France, assignors to Roussel-UCLAF, Paris, France, a corporation of France
No Drawing. Filed Feb. 19, 1962, Ser. No. 174,252
Claims priority, application France Mar. 1, 1961
16 Claims. (Cl. 260—340.9)

The present invention relates to new homologs of 13β-n-propyl-gonanes, particularly those steroids represented by the formula:

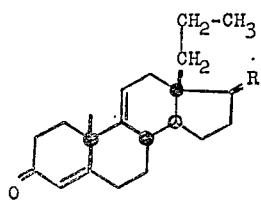

wherein R is selected from the group consisting of =O and

where Y is selected from the group consisting of hydrogen, the acyl radical of an organic carboxylic acid having from 1 to 18 carbon atoms and the acyl radical of a mineral acid.

The invention relates more particularly to 10β-methyl-13β-n-propyl-$\Delta^{4,9(11)}$-gonadiene-3,17 - dione, 10β - methyl-13β-n-propyl-$\Delta^{4,9(11)}$-gonadiene - 17β - ol - 3 - one and its esters.

These new 13β-n-propyl-gonanes present particularly interesting pharmacological properties. 10β-methyl-13β-n-propyl-$\Delta^{4,9(11)}$-gonadiene-17β-ol-3-one, itself, possesses an androgenic activity double that of the normal corresponding derivative, $\Delta^{4,9(11)}$-androstadiene-17β-ol-3-one. They constitute, in addition, precursors for 13β-n-propylated derivatives of the androstane series, of the pregnane series or of its spirostane series. They allow an easy access to 13β-n-propylated homologs of cortisonic steroids according to the following reaction flow diagram of Table I. The final compound produced is 18-nor-13β-n-propyl-$\Delta^4$-pregnene-17α,21-diol-3,11,20-trione, a homolog of cortisone.

TABLE I

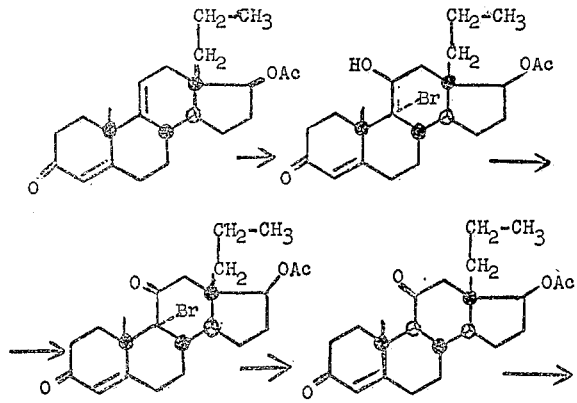

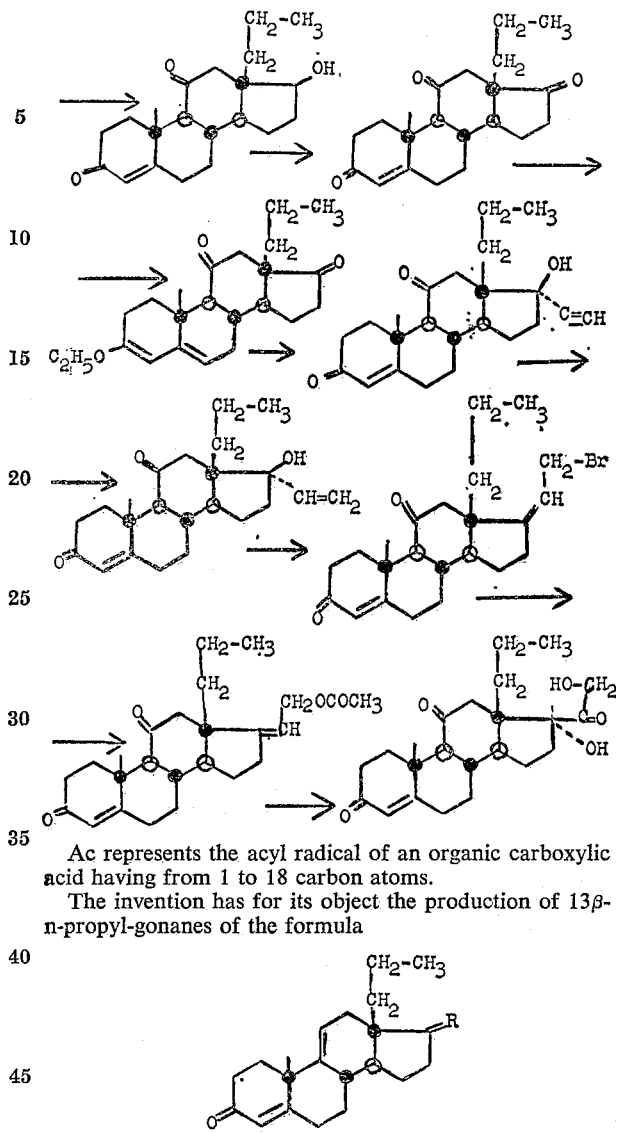

Ac represents the acyl radical of an organic carboxylic acid having from 1 to 18 carbon atoms.

The invention has for its object the production of 13β-n-propyl-gonanes of the formula

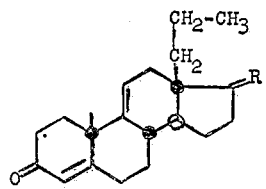

wherein R is selected from the group consisting of =O and

where Y is selected from the group consisting of hydrogen, the acyl radical of an organic carboxylic acid having from 1 to 18 carbon atoms and the acyl radical of a mineral acid.

Another object of the invention is the production of 10β-methyl 13β-n-propyl-$\Delta^{4,9(11)}$-gonadiene-3,17-dione, 10β methyl-13β-n-propyl-$\Delta^{4,9(11)}$-gonadiene-17β-ol-3-one, and its esters.

The invention also has for its object the development of a process for the production of the said 13β-n-propyl-gonanes.

A further object of the invention is the production of the novel intermediate compounds:

(a) 3-ethylenedioxy-13β-n-propyl-17β-benzoyloxy-4,5-seco-$\Delta^{9(10)}$-gonene-5-one;

(b) 3-ethylenedioxy-10β-methyl-13β-n-propyl-17β-benzoyloxy-4,5-seco-Δ9(11)-gonene-5-one; and, (c) 10β-methyl-13β-n-propyl-17β-benzoyloxy-4,5,seco-Δ9(10)-gonene-3,5-dione.

These and other objects of the invention will become more apparent as the description thereof proceeds.

The 13β-n-propyl-gonanes of the formula

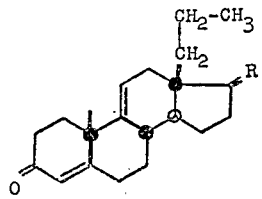

wherein R is selected from the group consisting of =O and

where Y is selected from the group consisting of hydrogen, the acyl radical of an organic carboxylic acid having from 1 to 18 carbon atoms and the acyl radical of a mineral acid, are produced by the following steps:

(a) A preliminary selective blockage of the ketone function in the 3-position of 13β-n-propyl-17β-acyloxy-4,5-seco-Δ9(10)-gonene-3,5-dione;

(b) Introduction of a methyl group in the 10β-position on the 3-ethylenedioxy-13β-n-propyl-17β-acyloxy-4,5-seco-Δ9(10)-gonene-5-one formed, accompanied by a displacement of the double bond to the 9(11)-position;

(c) A deblockage of the ketone function in the 3-position by hydrolysis;

(d) A cyclization by aldol condensation and dehydration in an alkaline media of 10β-methyl-13β-n-propyl-17β-acyloxy-4,5-seco-Δ9(11)-gonene-3,5-dione formed with simultaneous saponification of the ester function in the 17-position; and, (e) Re-esterification of the 10β-methyl-13β-n-propyl-Δ4,9(11)-gonadiene 17β-ol-3-one formed, if desired; or, oxidation of the alcohol in the 17-position to give 10β-methyl - 13β - n-propyl-Δ4,9(11)-gonadiene-3,17-dione, if desired.

The process of the invention is depicted in the flow diagram of Table II.

TABLE II

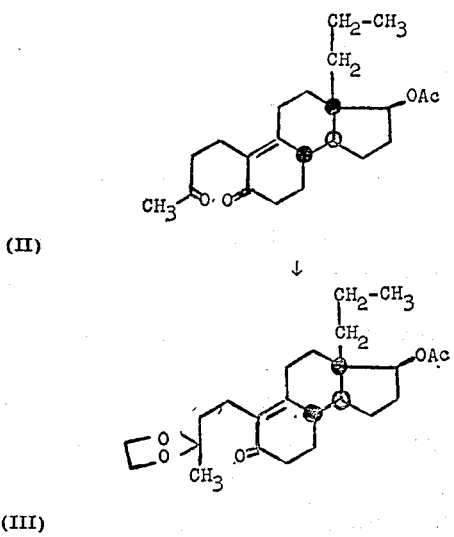

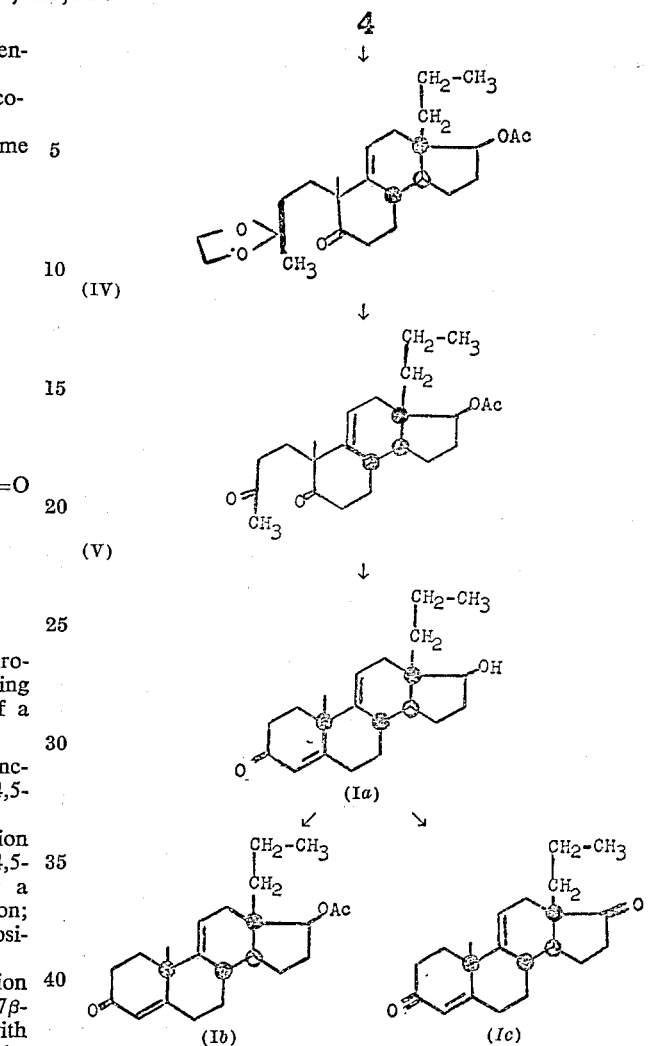

Ac represents an acyl radical.

The preferred starting compound is 13β-n-propyl-17β-benzoyloxy-4,5-seco-Δ9(10)-gonene-3,5-dione. This compound is described and prepared according to the process of co-pending United States patent application Serial Number 96,062, filed January 19, 1961, commonly assigned.

According to a preferred process of the invention:

(a) The selective ketalization of the ketone function in the 3-position is realized by reaction of 17β-benzoyloxy 13β-n-propyl-4,5-seco-Δ9(10)-gonene-3,5-dione with methylethyldioxolane in the presence of an acid catalyst;

(b) The introduction of the methyl group in the 10β-position accompanied with a displacement of the 9(10) double bond to the 9(11)-position is made by an enolization reaction on the 5-ketone group by means of an alkali metal alkanolate in solution in an inert organic solvent followed by a reaction with a methylating reactant;

(c) The liberation of the blocked ketone function in the 3-position is obtained by acid hydrolysis; and, (d) The cyclization by aldol condensation and dehydration in an alkaline media forming the A ring is effected by action of a solution of an alkali metal hydroxide in a lower alkanol at reflux in an inert atmosphere. The cyclization is accompanied with a simultaneous saponification of the ester function in the 17-position.

The alcohol function of the 10β-methyl-13β-n-propyl-Δ4,9(11)-gonadiene-17β-ol-3-one can be esterified again by a function derivative of a mineral or organic carboxylic acid or it can be oxidized into a ketone by an acetic acid solution of chromic acid anhydride.

According to the preferred operating method the formation of the ethylene ketal in the 3-position of 13β-n-propyl-17β-benzoyloxy-4,5-seco-Δ⁹⁽¹⁰⁾-gonene - 3,5 - dione is made by heating the compound at reflux with a solution of methylethyldioxolane in benzene. Ketalization occurs almost exclusively on the desired ketone function in the 3-position. It is catalyzed by the presence of a small amount of a strong acid, such as, for example, p-toluenesulfonic acid.

The enolization of the ketone function in the 5-position with migration of the 9(10) double bond to the 9(11)-position after blockage of the ketone function in the 3-position is effected by means of an alkali metal lower alkanolate, preferably a tertiary-amylate such as potassium tertiary-amylate at reflux temperature in a hydrocarbon solvent such as toluene.

The subsequent methylation is effected at room temperature by means of a methyl halide, such as methyl iodide, in an inert hydrocarbon solvent, toluene particularly. The reaction occurs preferably at about 20° C. (room temperature).

The hydrolysis of the 3-ethyleneketal is made by heating to a temperature between about 50° C. and 100° C. in dilute acetic acid and more particularly by heating to 60° C. in 75% aqueous acetic acid.

The cyclization reaction by aldol condensation and dehydration is made by heating to reflux in an excess of a methanolic potassium hydroxide solution.

The oxidation of the alcohol function freed thereby in the 17-position is made at room temperature by means of chromic acid anhydride, preferably in acetic acid.

By the term "gonane" and its variations, such as "gonene," etc., we mean compounds having hydrogenated cyclopentanophenanthrene nucleus and having the steric configuration of the natural steroids. The compounds so named could also be called 18,19-di-nor-androstanes.

In addition to the benzoic acid ester of the starting compound, other esters with organic carboxylic acids having from 1 to 18 carbon atoms may be used, such as the alkanoates and alkenoates, for example, the acetate, the trimethylacetate, the propionate, the 4,4-dimethyl-pentanoate, the 10-undecenoate; the cycloalkyl-alkanoates, for example, the β-cyclopentyl-propionate; the arylalkanoates, for example, the phenyl-propionate; the cycloalkanoates, for example, the hexahydrobenzoate, the hexahydroterephthalate, other phenyl-carboxylic acids, halobenzoates, 3,5-dinitrobenzoate, and naphthoates. All of the above organic carboxylic acids having from 1 to 18 carbon atoms, together with mineral acids such as sulfuric acid, phosphoric acid, etc., may be used to prepare esters in the 17β-position of 10β - methyl-13β-n-propyl-Δ⁴,⁹⁽¹¹⁾-gonadiene-17β-ol-3-one. Such other esters are prepared by reacting the corresponding esterifying acid derivatives such as the acid, acid chloride, or acid anhydride.

One could use as enolization agents other alkali metal lower alkanolates than potassium tertiary-amylate, as for example, lithium, sodium or cesium lower alkanolates, or even use other oxidation agents to oxidize the alcohol function of 10β - methyl-13β-n-propyl-Δ⁴,⁹⁽¹¹⁾-gonadiene-17β-ol-3-one, than chromic acid anhydride without departing from the body of the invention.

It is also obvious that one can vary the nature of the solvents, the temperatures or the duration of the reactions without thereby modifying the nature of the invention.

The following example is given as purely indicative of the invention. It is obvious that other expedients known to those skilled in the art may be employed without departing from the spirit of the invention. The temperatures indicated are expressed in degrees centigrade. The melting points have been determined on the Maquenne block.

*Example*

STEP A.—PREPARATION OF 3-ETHYLENEDIOXY-13β-n-PROPYL - 17β - BENZOYLOXY-4,5-SECO-Δ⁹⁽¹⁰⁾-GONENE-5-ONE (COMPOUND III)

A mixture of 1 g. of 13β-n-propyl-17β-benzoyloxy-4,5-seco-Δ⁹⁽¹⁰⁾-gonene-3,5-dione, 10 cc. of benzene, 10 cc. of methylethyldioxolane, and 20 mg. of p-toluenesulfonic acid was heated rapidly to reflux. After 10 minutes of refluxing the solution was cooled equally rapidly and poured into 20 cc. of an aqueous solution containing 5% sodium bicarbonate. After separation, washing and drying of the organic solution it was distilled to dryness. 1.1 g. of an oil were obtained comprising 3-ethylenedioxy-13β-n-propyl - 17β - benzoyloxy-4,5-seco-Δ⁹⁽¹⁰⁾-gonene-5-one. By chromatography, then crystallization, from isopropyl ether and from methanol an analytical product was obtained, melting at 113.5° C. The product crystallized in colorless prisms, soluble in benzene and alcohol, slightly soluble in isopropyl ether and methanol, and insoluble in water.

The 3-ethylenedioxy-13β-n-propyl-17β-benzoyloxy-4,5-seco-Δ⁹⁽¹⁰⁾-gonene-5-one had the following physical constants:

Specific rotation: $[\alpha]_D^{20} = +29.5°$ (c.=0.55% in methanol). U.V. spectra (ethanol):

$\lambda_{max}$. 237 mμ $E_{1\ cm.}^{1\%} = 467$ $\lambda_{max}$. 250 mμ (inflex.) $E_{1\ cm.}^{1\%} = 386$ $\lambda_{max}$. 280 mμ (inflex.) $E_{1\ cm.}^{1\%} = 22$ The absorption at 237 mμ corresponded to 99% of conjugated ketone.

I.R. spectra (carbon disulfide): 100% of conjugated ketone.

*Analysis.*—$C_{29}H_{38}O_5$; molecular weight=466.59. Calculated: 74.64% C; 8.20% H. Found: 74.8% C; 8.2% H. This compound is not described in the literature.

STEP B.—PREPARATION OF 3-ETHYLENEDIOXY-10β-METHYL-13β-n-PROPYL - 17β - BENZOYLOXY-4,5-SECO-Δ⁹⁽¹¹⁾-GONENE-5-ONE (COMPOUND IV)

(a) *Preparation of potassium tertiary-amylate.*—In a previously dried multiple-necked balloon flask, 40 cc. of toluene dried over sodium, 5 cc. of redistilled tertiary amyl alcohol, then about 2 g. of freshly cleaned metallic potassium were successively introduced. The mixture was heated for an hour and a half under an atmosphere of nitrogen, then allowed to return to room temperature. The titer of this potassium tertiary-amylate solution is in the neighborhood of normality.

(b) *Metallation.*—Into a carefully dried multiple-necked balloon flask provided with a means of agitation and a means for bubbling nitrogen therethrough, there were introduced 200 mg. of 3-ethylenedioxy-13β-n-propyl-17β-benzoyloxy-4,5-seco-Δ⁹⁽¹⁰⁾-gonene-5-one (prepared in step A) dissolved in 2 cc. of toluene. 0.5 cc. of the solution of potassium tertiary-amylate prepared as above was then added in one amount under an atmosphere of nitrogen. The apparatus was plunged into an oil bath heated to 140° C. The temperature of the solution was rapidly raised to the reflux temperature, and refluxing was maintained for a period of 15 minutes. A slight precipitate appeared which was increased by cooling to room temperature.

(c) *Alkylation.*—480 mg. of methyl iodide in 1 cc. of toluene were added to the solution of the preceding potassium enolate derivative over a period of 5 minutes. A total solution of the mixture was first produced, then after about 5 minutes a precipitation occurred which increased with time. The reaction mixture was allowed to stand 17 hours at 20° C. under agitation and an atmosphere of nitrogen. At the end of this time, water was added and the solution was extracted two times with 70 cc. of ether. The ethereal solutions were decanted, combined and washed three times with 40 cc. of water. The dried ethereal phase was evaporated to dryness.

212 mg. of raw 3-ethylenedioxy-10β-methyl-13β-n-propyl - 17β - benzoyloxy - 4,5 - seco - Δ⁹⁽¹¹⁾-gonene-5-one were thus obtained, being a quantitative yield.

This compound is not described in the literature.

U.V. spectra (ethanol):

$\lambda_{max}$ 229–230 m$\mu$ $E_{1\ cm.}^{1\%}$=288; 273 m$\mu$ $E_{1\ cm.}^{1\%}$=20.4; 201 m$\mu$ $E_{1\ cm.}^{1\%}$=16.8

These spectra showed the absence of a conjugated ketone of the form:

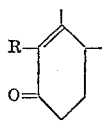

This compound was sufficiently pure for use as such for the next step of the synthesis.

STEP C.—PREPARATION OF 10β-METHYL-13β-n-PROPYL-17β-BENZOYLOXY-4,5-SECO-Δ⁹⁽¹¹⁾-GONENE - 3,5 - DIONE (COMPOUND V)

212 mg. of compound IV, obtained in the preceding step, were dissolved in 15 cc. of a 75% acetic acid solution. The homogenous solution was maintained for 1 hour at a temperature of 60° C. under an atmosphere of nitrogen. The solution was next cooled to 20° C., neutralized by a solution of sodium bicarbonate and extracted with ether. The combined ethereal phases were washed with water until neutral, dried over anhydrous sodium sulfate, then, after filtration, evaporated to dryness.

193 mg. of 10β-methyl-13β-n-propyl-17β-benzoyloxy-4,5-seco-Δ⁹⁽¹¹⁾-gonene-3,5-dione were thus obtained, being a quantitative yield.

The product was used without further purification for the next step of the synthesis.

This compound is not described in the literature.

STEP D.—PREPARATION OF 10β-METHYL-13β-n-PROPYL-Δ⁴,⁹⁽¹¹⁾-GONADIENE-17β-OL-3-ONE (COMPOUND Ia)

193 mg. of 10β-methyl-13β-n-propyl-17β-benzoyloxy-4,5-seco-Δ⁹⁽¹¹⁾-gonene-3,5-dione, prepared according to the preceding step, were dissolved in 19.3 cc. of a methanolic solution containing 0.5 N potassium hydroxide. The mixture was heated for 1 hour at reflux under an atmosphere of nitrogen. The solution had an orange coloration. It was evaporated to dryness under vacuum, then taken up with 40 cc. of water. The precipitate which appeared was extracted by two 70 cc. aliquots of ethyl ether. The ethereal phases were combined, washed with water until the wash waters were neutral, dried, filtered and evaporated to dryness under vacuum.

130 mg. of a friable yellow resin were thus obtained. The yield was 96.5%.

This resin was subjected to chromatography over magnesium silicate. After elution with methylene chloride containing 0.5% of acetone, there was obtained, after evaporation, a colorless resin which was crystallized from isopropyl ether, then from ethyl acetate. Pure 10β-methyl - 13β - n - propyl - Δ⁴,⁹⁽¹¹⁾ - gonadiene - 17β - ol-3 one was otbained. It occurred in the form of colorless prisms, very soluble in acetone, benzene and chloroform, soluble in alcohol and ether, insoluble in water, having a melting point of 135.5° C. and a specific rotation [α]$_D^{20}$=+82°±1° (c.=0.5% in methanol).

U.V. spectra: Showed the presence of the 3-oxo-Δ⁴ group. I.R. spectra: Confirmed the proposed structure.

Analysis.—$C_{21}H_{30}O_2$; molecular weight=314.45. Calculated: 80.20% C.; 9.61% H. Found: 80.3% C.; 9.5% H.

This compound is not described in the literature.

STEP E.—PREPARATION OF 10β-METHYL-13β-n-PROPYL-Δ⁴,⁹⁽¹¹⁾-GONADIENE-3,17-DIONE (COMPOUND Ic)

130 mg. of 10β-methyl-13β-n-propyl-Δ⁴,⁹⁽¹¹⁾-gonadiene-17β-ol-3-one, prepared according to the preceding step, were dissolved in 16.2 cc. of pure acetic acid. To the solution thus obtained, 0.78 cc. of an oxidizing mixture formed from the following ingredients was added:

| | |
|---|---|
| Chromic anhydride | g 0.61 |
| Water | cc 0.48 |
| Acetic acid | cc 4.8 |

The reaction was allowed to continue for a period of 80 minutes at about 20° C. under agitation. The mixture remained brown. At the end of the reaction, 3.2 cc. of methanol were added in order to destroy the excess of the reactant. The mixture was allowed to remain 15 minutes under agitation. The solution, which became greenish, was neutralized by a solution of sodium bicarbonate, then extracted with two 100 cc. aliquots of ether. The combined ethereal solutions were washed with water until the wash waters were neutral, dried, filtered and finally brought to dryness under vacuum.

104 mg. of a yellow resin were thus obtained, being a yield of 80%. The product was purified by triturbation in isopropyl ether, then recrystallized by heating and cooling in ethyl acetate. A first yield was thus obtained weighing 22 mg. and melting at 165° C. The mother liquors were brought to dryness, and 77 mg. of a resin were recovered which was subjected to chromatography over silica gel. After elution with methylene chloride containing 1% of acetone, 47 mg. of purified product were obtained after evaporation. After trituration with isopropyl ether, a second yield of 18.5 mg. of pure 10β - methyl - 13β - n - propyl - Δ⁴,⁹⁽¹¹⁾ - gonadiene - 3,17-dione were obtained.

The overall yield of the pure product is thus 30%.

10β - methyl - 12β - n - propyl - Δ⁴,⁹⁽¹¹⁾ - gonadiene-3,17-dione is not described in the literature.

It occurred in the form of a colorless crystalline solid, soluble in chloroform, slightly soluble in ethyl acetate, insoluble in water. The compound had a melting point of 165.5° C., and a specific rotation

[α]$_D^{20}$=+173°±2° (c.=0.5% in methanol)

I.R. spectra: Presence of the 3-oxo-Δ⁴ group, a ketone function in the 17-position, and absence of the —OH group.

The spectra were different from those of 13β-methylated steroids. The curve of circular dichroism was practically superimposable on that obtained from Δ⁴,⁹⁽¹¹⁾-androstadiene-3,17-dione.

U.V. spectra: Showed the presence of a conjugated 3-oxo-Δ⁴⁽⁵⁾ ketone.

Analysis.—$C_{21}H_{28}O_2$; molecular weight=312.43. Calculated: 80.72% C.; 9.03% H. Found: 80.7% C.; 9.0% H.

The 10β - methyl - 13β - n - propyl - Δ⁴,⁹⁽¹¹⁾ - gonadiene-17β-ol-3-one can be esterified by conventional means with esterifying derivatives of any of the acids above enumerated to obtain an ester corresponding to Compound Ib.

It is to be understood that the invention is not limited to the process of the example given above, and other expedients can be employed without departing from the spirit of the invention and the scope of the appended claims.

We claim:

1. 13β-n-propyl-gonanes of the formula

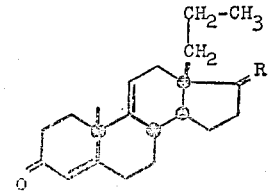

wherein R is selected from the group consisting of =O and

where Y is selected from the group consisting of hydrogen, the acyl radical of an organic carboxylic acid having from 1 to 18 carbon atoms and the acyl radical of a mineral acid.

2. 10β-methyl-13β-n-propyl-Δ⁴,⁹⁽¹¹⁾-gonadiene-3,17-dione.

3. 10β-methyl-13β-n-propyl-Δ⁴,⁹⁽¹¹⁾-gonadiene-17β-ol-3-one.

4. 3-ethylenedioxy-13β-n-propyl-17β-benzoyloxy-4,5-seco-Δ⁹⁽¹⁰⁾-gonene-5-one.

5. 3-ethylenedioxy-10β-methyl-13β-n-propyl-17β-benzoyloxy-4,5-seco-Δ⁹⁽¹¹⁾-gonene-5-one.

6. 10β-methyl-13β-n-propyl-17β-benzoyloxy-4,5-seco-Δ⁹⁽¹¹⁾-gonene-3,5-dione.

7. The process of preparing 13β-n-propyl-gonanes of the formula

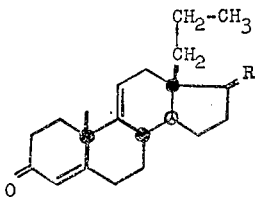

wherein R is selected from the group consisting of =O and

where Y is selected from the group consisting of hydrogen, the acyl radical of an organic carboxylic acid having from 1 to 18 carbon atoms and the acyl radical of a mineral acid which comprises the steps of selectively blocking the ketone function in the 3-position of a compound having the formula

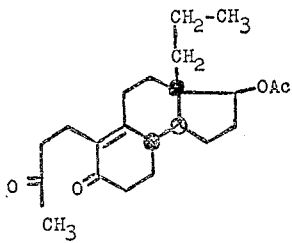

wherein Ac represents the acyl radical of an organic carboxylic acid having from 1 to 18 carbon atoms by the formation of an ethylene ketal, reacting said 3-ethylenedioxy-13β-n-propyl-17β-OAc-4,5-seco-Δ⁹⁽¹⁰⁾-gonene-5-one, wherein Ac has the above-assigned meaning, with an alkali metal lower alkanoate in an inert organic solvent and adding a methyl halide in order to introduce a methyl group in the 10β-position after displacing the 9(10) double bond to the 9(11)-position, deblocking the ketone function in the 3-position, by acid hydrolysis, cyclizing the compound having the formula

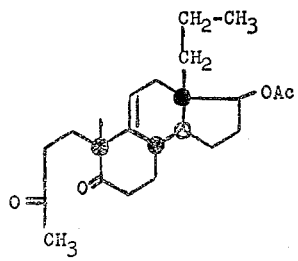

where Ac has the above assigned meaning with simultaneous saponification by means of an alkali metal hydroxide in an inert organic solvent at reflux temperatures, and recovering said 13β-n-propyl-gonanes.

8. The process of claim 7, wherein the ketone function in the 3-position is selectively blocked by means of methylethyldioxolane in the form of an ethylene ketal.

9. The process of claim 7, wherein 10β-methyl-13β-n-propyl-Δ⁴,⁹⁽¹¹⁾-gonadiene-3,17-dione is recovered by oxidizing the 10β-methyl-13β-n-propyl-Δ⁴,⁹⁽¹¹⁾-gonadiene-17β-ol-3-one with chromic acid in an acidic media.

10. A process of preparing 10β-methyl-13β-n-propyl-Δ⁴,⁹⁽¹¹⁾-gonadiene-3,17-dione which comprises the steps of reacting 13β-n-propyl-17β-benzoyloxy-4,5-seco-Δ⁹⁽¹⁰⁾-gonene-3,5-dione with methylethyldioxolane in the presence of strong acid ketalization catalyst, reacting the 3-ethylenedioxy-13β-n-propyl-17β-benzoyloxy-4,5-seco-Δ⁹⁽¹⁰⁾-gonene-5-one successively with an alkali metal tertiary-amylate and a methyl halide in an inert organic solvent, hydrolyzing the 3-ethylenedioxy-10β-methyl-13β-n-propyl-4,5-seco-Δ⁹⁽¹¹⁾-gonene-5-one in an acidic medium, cyclizing the 10β-methyl-13β-n-propyl-17β-benzoyloxy-4,5-seco-Δ⁹⁽¹¹⁾-gonene-3,5-dione by the action of an alkali metal hydroxide in an inert organic solvent at elevated temperatures, oxidizing the 10β-methyl-13β-n-propyl-Δ⁴,⁹⁽¹¹⁾-gonadiene-17β-ol-3-one with chromic acid in an acidic media and recovering said 10β-methyl-13β-n-propyl-Δ⁴,⁹⁽¹¹⁾-gonadiene-3,17-dione.

11. The process of claim 10, wherein said ketalization catalyst is p-toluenesulfonic acid in solution in methylethyldioxolane.

12. The process of claim 10, wherein said alkali metal tertiary-amylate is potassium tertiary-amylate.

13. The process of claim 10, wherein said methyl halide is methyl iodide.

14. The process of claim 10, wherein the acid hydrolysis of the ethylene ketal is effected by heating in aqueous acetic acid.

15. The process of claim 10, wherein the cyclization is effected by means of a methanolic solution of potassium hydroxide at reflux temperatures.

16. The process of claim 10, wherein said chromic acid in an acidic media utilized is an acetic acid solution of chromic acid anhydride.

References Cited in the file of this patent
Heyl et al.: J.A.C.S., 77 pp. 488–489 (1955).